(12) United States Patent  (10) Patent No.: US 7,542,852 B1
Rose et al.  (45) Date of Patent: Jun. 2, 2009

(54) DERIVATION AND PRODUCTION OF HIGH-RESOLUTION, VERY SHORT-TERM WEATHER FORECASTS

(76) Inventors: Bruce L. Rose, 4004 Rhyne Cir., Smyrna, GA (US) 30082; Ian James Miller, 5342 Curry Ct., Marietta, GA (US) 30068; William Anthony Cassanova, 4816 Lake Fjord Pass, Marietta, GA (US) 30068

( * ) Notice: Subject to any disclaimer, the term of this patent is extended or adjusted under 35 U.S.C. 154(b) by 0 days.

(21) Appl. No.: 11/695,353

(22) Filed: Apr. 2, 2007

Related U.S. Application Data

(63) Continuation-in-part of application No. 11/372,717, filed on Mar. 10, 2006, now Pat. No. 7,200,491, which is a continuation of application No. 11/042,681, filed on Jan. 25, 2005, now Pat. No. 7,082,382.

(51) Int. Cl.
  *G01R 13/00* (2006.01)
  *G01R 29/26* (2006.01)
  *G06F 19/00* (2006.01)
(52) U.S. Cl. .................... 702/3; 702/5; 73/170.16; 342/26 R
(58) Field of Classification Search .................... 702/3, 702/4, 5; 342/26 R; 73/170.16
  See application file for complete search history.

(56) References Cited

U.S. PATENT DOCUMENTS

| | | | |
|---|---|---|---|
| 4,218,755 A | 8/1980 | Root | 364/900 |
| 5,255,190 A | 10/1993 | Sznider | 364/420 |
| 5,440,483 A * | 8/1995 | Badoche-Jacquet et al. | 702/3 |
| 5,959,567 A * | 9/1999 | Wolfson et al. | 342/26 R |
| 5,974,360 A | 10/1999 | Otsuka | 702/3 |
| 6,018,307 A | 1/2000 | Wakayama et al. | 342/26 |

(Continued)

FOREIGN PATENT DOCUMENTS

JP  04/363688  12/1992

(Continued)

OTHER PUBLICATIONS

Wilson, 'Very Short Period (0-6) Forecasts of Thunderstorms', Dec. 2004, NCAR, Boulder, Colorado, pp. 1-6.*

(Continued)

*Primary Examiner*—Edward Raymond
*Assistant Examiner*—Elias Desta
(74) *Attorney, Agent, or Firm*—Lawrence A. Aaronson

(57) ABSTRACT

Weather forecasting systems and methods for deriving and producing very short-term weather forecasts. Weather data and forecast information maybe input to derive very short-term weather forecasts in the 0-6 hour time frame. The system and methods include an expert system employing a hybrid or blending of forecasting approaches, with dynamic or intelligent arbitration of the different numerical, statistical, and human-driven techniques to produce more accurate weather forecasts for very short-term time periods. A calibration or internal verification against ground truth may be run independently with a time lag to produce more accurate future predictions of atmospheric state. The systems and methods may run in modes that produce either high resolution weather forecasts in the short-term period of 0-6 hours or a combination of synthetic, real-time weather observations/conditions and high resolution, short-term weather forecasts.

27 Claims, 9 Drawing Sheets

U.S. PATENT DOCUMENTS

| | | | |
|---|---|---|---|
| 6,035,710 A | 3/2000 | Hutchison et al. | 73/170.16 |
| 6,128,578 A | 10/2000 | Sakaino et al. | 702/3 |
| 6,201,494 B1 | 3/2001 | Kronfeld | 342/26 |
| 6,278,947 B1 * | 8/2001 | Baron et al. | 702/3 |
| 6,535,817 B1 | 3/2003 | Krishnamurti | 702/3 |
| 6,542,825 B2 * | 4/2003 | Jones et al. | 702/3 |
| 6,581,009 B1 | 6/2003 | Smith | 702/3 |
| 6,654,689 B1 * | 11/2003 | Kelly et al. | 702/3 |
| 6,675,099 B2 | 1/2004 | Katsuhiro | 702/3 |
| 6,792,399 B1 | 9/2004 | Phillips et al. | 703/2 |
| 6,801,856 B2 | 10/2004 | Ohba et al. | 702/3 |
| 6,920,233 B2 | 7/2005 | Wolfson et al. | 382/100 |
| 6,985,837 B2 | 1/2006 | Moon et al. | 703/2 |
| 7,016,784 B2 | 3/2006 | Allen et al. | 702/3 |
| 7,062,066 B2 | 6/2006 | Wolfson et al. | 382/100 |
| 7,181,345 B2 * | 2/2007 | Rosenfeld et al. | 702/3 |
| 2002/0038353 A1 | 3/2002 | Yamamoto | 709/217 |
| 2002/0114517 A1 | 8/2002 | Wolfson et al. | 382/181 |
| 2003/0004780 A1 | 1/2003 | Smith et al. | 705/10 |
| 2003/0086605 A1 | 5/2003 | Doner | 382/166 |
| 2003/0151591 A1 | 8/2003 | Harpen et al. | 345/156 |
| 2003/0156734 A1 | 8/2003 | Wolfson et al. | 382/100 |
| 2004/0010372 A1 | 1/2004 | Schwoegler | 702/3 |
| 2004/0043760 A1 * | 3/2004 | Rosenfeld et al. | 455/414.3 |
| 2004/0143396 A1 * | 7/2004 | Allen et al. | 702/3 |
| 2004/0162675 A1 | 8/2004 | Moon et al. | 702/3 |
| 2004/0215394 A1 | 10/2004 | Carpenter, Jr. et al. | 702/3 |
| 2004/0215483 A1 * | 10/2004 | Fixman | 705/1 |
| 2004/0239550 A1 | 12/2004 | Daly, Jr. | 342/26 |

FOREIGN PATENT DOCUMENTS

| | | |
|---|---|---|
| JP | 04/04069469 | 3/2004 |

OTHER PUBLICATIONS

Doviac, et al., "Single-Parameter Measurement to Estimate the Rainfall Rate", *Doppler Radar and Weather Observations*, 1993, 8.4-8.4.2, pp. 198-203.

Rasmussen, R.M. et al., "The Estimation of Snowfall Rate Using Visibility", *Journal of Applied Meteorology*, 1999, 38, 1542-1563.

\* cited by examiner

| Input/Source 700 | Real-Time Current Conditions System (t=0) 702 | Short-Term Forecast System (t=+1 to +6 hrs) 704 |
|---|---|---|
| Domain | CONUS at 2.5 km resolution | CONUS at 5 km resolution |
| Valid times | Current or real time | +15 minute intervals through 6 hours in the future |
| Frequency | 3x hourly | 2x hourly |
| Latency | About 5 minutes | About 12 minutes |
| Accuracy | About 2°F MAE | Unknown/TBD |
| Hardware | 33x4-processor AMD servers | 40x4-processor AMD servers |

FIG. 7

| Input/Source 700 | Current Conditions System (t=0) 702 | Short-Term Forecast System (t=+1 to +6 hrs) 704 |
|---|---|---|
| Surface OBS | ASOS/AWOS and mesonet METAR's | GFC hourly forecasts transformed to OBS |
| Mesoscale Model | NWS Rapid Update Cycle (1 hr, 13 km) | NWS RUC model (same) |
| Lightning | WDT USPLN lightning Network (1 min, 200 m) | WDT Probabalistic Lightning predictor |
| Radar | 1 and 2 km WSI Premium winter NOWRAD (5-6 min) | WDT 4-6 hr MAPLE Lagrangian extrapolation |
| Satellite | GOES mid and high cloud analysis | N/A |
| Climatology | PRISM – Oregon State high-res [2 km] climo | PRISM |

FIG. 7 – cont'd

DERIVATION AND PRODUCTION OF HIGH-RESOLUTION, VERY SHORT-TERM WEATHER FORECASTS

CROSS-REFERENCE TO RELATED APPLICATIONS

This application is a Continuation-in-Part of application Ser. No. 11/372,717, filed Mar. 10, 2006, which is a Continuation application of application Ser. No. 11/042,681, filed Jan. 25, 2005 (now U.S. Pat. No. 7,082,382).

TECHNOLOGY FIELD

The present invention relates to weather data or content analysis. More particularly, the present invention relates to systems and methods that utilize weather data and forecast information to derive and provide very short-term weather forecasts.

BACKGROUND

In the United States, the commercial weather sector provides forecasts, observations, and other meteorological content to businesses and consumers for direct fees and other forms of compensation. There is, at any time, a strong drive for value-added differentiation in this sector, since most of the basic weather forecast and observational data originates from a freely available, public data source—the National Weather Service (NWS).

Weather information vendors attempt to add value to the basic, public-domain database in many ways to distinguish themselves over other vendors. One area in which value-added products and services are being developed is weather forecasting, and more particularly, very short-term weather forecasting.

Very short-term weather forecasting is generally limited to the first six hours beyond present time (i.e., 0-6 hours). Numerical Weather Prediction (NWP), statistical post-processing of NWP output (e.g., MOS, DMOS, and Perfect Prog), and the human forecaster play important and interrelated roles in the creation of longer range forecasts (i.e., 1-10 days into the future) that are the staple of most public and private weather firms' products and services. In the creation and dissemination of very near term (i.e., 0-6 hours) weather forecasts, however, there are problems with each of these component parts of the forecasting equation.

For example, NWP models simulations often suffer from cold starts or spin-up issues. It is well known and understood that objective Nowcasts via traditional NWP sources are poor because of this spin-up problem. As used herein, Nowcasts is defined as forecasts of what the weather will do in the next few hours and, for the purposes of this application disclosure, can be considered synonymous with the term "very short-term forecasts" or simply "short-term forecasts".

Statistical post-processes or stand-alone statistical forecasts either suffer from their dependence on NWP output as a starting point, or by their stochastic and non-specific orientation.

The human forecaster is generally good at reacting to and interpreting current weather situations and intuitively extrapolating them into the future, but the very nature of high-resolution (in time and space) short-term forecasts often precludes lengthy analysis and diagnoses because of the short response times necessary to disseminate important Nowcast information.

FIG. 1 is a qualitative depiction of short-term forecast skill in accuracy for different Nowcasting techniques (from Wilson et. al., 1998), and depicts the relationship between forecast skill and time into the future for a number of methods or techniques that may be employed for this purpose. The radar extrapolation or predicative radar is a technique to advect or extrapolate radar reflectivity or echoes into the future based on their current spatial extent and a calculation of the mean direction and speed of movement of existing radar echoes. As shown, this method may be effective in the first ½ to 1 hour, but its skill falls to near zero beyond this time due to issues with propagation, initiation, growth, and decay of precipitating systems.

Conversely, the large scale model (e.g., large-scale NWP) shows little or no skill in the 0-6 hour timeframe, yet its skill or accuracy rises beyond this. One reason for this is that large-scale models suffer from spin-up and as a result have very little skill in the very short-term.

Also, there is a class of NWP called high-resolution (generally below 5 km in the horizontal) explicit models that exhibit better short-range skill based on very sophisticated model initializations of the atmospheric state including explicit treatment of small scale atmospheric processes such as, for example, precipitation processes. Explicit models, however, are still inferior to expert systems or hybrid approaches.

FIG. 2 (from German and Zawadzky, 2002) depicts a second important facet of the very short-term forecasting challenge. In this graph of skill versus time, forecasts are partitioned according to the type of the precipitation rate associated with the system. In this analysis, one can see that precipitating systems exhibiting intense or high precipitation rates are more difficult to predict for appreciable times into the future. Conversely, precipitation systems exhibiting small precipitation rates are more tractable in terms of anticipating their future behavior.

This behavior is most closely linked to the vertical structure of the precipitating system. Those exhibiting intense precipitation rates are most often associated with convective systems of significant vertical extent and limited horizontal extent such as thunderstorms. Systems that have limited or shallow vertical extent but broad horizontal extent are associated with stratiform clouds and lighter precipitation rates. Thus, not surprisingly, there is a distinct dichotomy between the skill of predicting short-lived convective systems much beyond one hour in time—while broader synoptic or stratiform systems can often be skillfully predicted some four, six or more hours into the future.

Thus, in view of the foregoing, there is a need for systems and methods that overcome the limitations and drawbacks of the prior art. In particular, there is a need for systems and methods that provide improved accuracy with respect to conventional single mode methods of very short-term forecasts, such as radar extrapolation, manual human forecasts, and explicitly resolved high-resolution numerical weather predictions. There is strong evidence that a system or method which determines an optimal blend of inputs from such single mode short-term forecasting techniques and dynamically arbitrates between these methods based upon the weather situation or other criteria—would significantly advance the current status of nowcasting accuracy and utility. In the context herewith, an expert system therefore can be defined as a program or system that uses a composite of problem-solving approaches and in due course arbitrates the optimal blend of these approaches based on some internal feedback mechanism or measuring process. Embodiments of the present invention provide such an expert system solution to the weather nowcasting challenge.

SUMMARY

The following is a simplified summary of the invention in order to provide a basic understanding of some of the aspects of the invention. This summary is not intended to identify key or critical elements of the invention or to define the scope of the invention.

The present invention allows for the derivation of very short-term weather forecasts in the 0-6 hour timeframe. The systems and methods may accept inputs of high-resolution weather data and forecast information and may run high spatial and temporal resolution weather forecasts for various weather conditions in the very short-term period of 0-6 hours. These very short-term weather forecasts provide improved accuracies when compared to conventional single mode methods of very short-term forecasts.

According to one aspect of the invention, the methodology currently considered the most skillful in the 0-6 hour time period is ambiguously termed "expert system." This expert system may be characterized by a hybrid of methods that are thought to be skillful in predicting the evolution of weather systems in the very short-term. This methodology might take some predetermined blend of inputs from forecasting techniques, such as radar extrapolation, explicit model, and human-derived techniques and sources or—conversely—may dynamically arbitrate between the techniques/methods that are most appropriate or skillful given the weather situation, the forecast valid time (i.e., the time interval into the future), or the geographic region under scrutiny.

According to yet another aspect of the invention, specific and accurate very short-term weather forecasts may be derived and produced. In one embodiment, these very short-term weather forecasts include improved prediction of timing, location, and severity of convective storms. Preferably, the forecast engine may discriminate between precipitation type, intensity, and morphology of precipitation.

According to one embodiment of the present invention, a system for deriving very short-term weather forecasts is provided including weather data and forecast information that may be stored in a database. A plurality of forecasting techniques are provided, including for example, numerical, statistical, and human-derived forecasting techniques (e.g., radar extrapolation, explicit model, and the like). A forecast engine determines a blend of inputs from the available forecasting techniques and derives very short-term weather forecasts. An output system is provided for producing the very short-term weather forecasts.

According to one aspect of the invention, the very short-term weather forecasts include a time period of about 0-6 hours and comprise forecasts about a predicted or estimated state of the atmosphere near the earth's surface. The very shot-term weather forecasts may further include high-resolution temporal and spatial very short-term weather forecasts. The very short-term weather forecasts may include weather parameters meteorological conditions and quantities representative of a predicted state of the atmosphere near the earth's surface.

According to another aspect of the invention, the system may include an ingestor for intake of the weather data and forecast information. In a preferred embodiment, the weather data and forecast information includes high-resolution temporal and spatial weather data and forecast information.

The weather data and forecast information may further include one or more of: observations of actual meteorological conditions from a network of observation platforms; periodic forecasts of meteorological conditions, weather parameters, and forecast quantities; predicted radar images of reflectivity and precipitation type; lightning density forecasts; and forecast grids of meteorological quantities.

According to another aspect of the invention, the forecast engine may dynamically arbitrate between the plurality of forecasting techniques that are most skillful in predicting the evolution of weather systems given a weather situation, a forecast valid time, and/or a geographic region under scrutiny. Alternatively, the blending of the plurality of forecasting techniques may include a predetermined blend of inputs from available forecasting techniques.

The very short-term weather forecasts may be output as a real-time datastream to downstream content or publishing systems that await or listen for the real-time datastream. The very short-term weather forecasts may also be output as point and grid data. The output system may include one or more of: a visualization system, a display, a web-site, a lexical parser, a storage system, and an interface to another system.

According to one embodiment, the very short-term weather forecasts include high spatial and temporal resolution very short-term weather forecasts. The high spatial and temporal resolution may include horizontal detail or output on a substantially regularly spaced grid having grid intersections with a maximum of about 5 km spacing and explicit outputs about every 15 minutes or less.

According to another aspect of the invention, the forecast engine further comprises a core system interpolation. The core system interpolation may provide a plurality of very short-term meteorological quantities extracted from a public domain dataset at all grid point intersections over a specific location. The plurality of very short-term meteorological quantities may be adjusted from knowledge of a number of nearby human-driven forecasts corresponding to the same point in time. A first estimate of meteorological quantities may be provided comprising the adjusted meteorological quantities, wherein the first estimate is derived using a downscaling technique based on knowledge of climatological gradients or microclimatological relationships of the meteorological quantities in the vicinity of the grid points for the specific location. A second estimate for the meteorological quantities may be produced by a radar fingerprinter that finds a corresponding future radar image from predicted radar images and future lightning density forecasts that match a valid forecast time, wherein the radar fingerprinter produces the second estimate of the meteorological quantities from a small spatial sub-domain of predicted radar reflectivity, radar-based precipitation type, and lightning probability fields.

According to another aspect of the invention, the system further includes a calibrator that compares future radar predictions and newly arriving weather observations for known observation sites. A calibration score may be determined for each know observation site.

A system arbitrator and grid output generator may be provided and may use the calibration score from the set of neighbors of the target point or grid intersection in order to derive final derived meteorological quantities using the calibration scores, which may be used to determine a blending of the first estimate and the second estimate. The system may include an internal and objective calibration that is self-adjusting and capable of adapting and synthesizing to many different weather regimes or permutations through learning or training based on experience over time.

According to another embodiment of the invention, a combination system may be provided for deriving high-resolution, real-time synthetic meteorological conditions and high-resolution, very short-term weather forecasts for a specific location. The combination system may include a database for storing real-time weather data and forecast information. A plurality of forecasting techniques, including numerical, statistical, and human-driven forecasting techniques are provided. An observation/forecast engine is provided for determining a blend of inputs from the plurality of forecasting techniques. Real-time synthetic meteorological conditions may be generated by the observation/forecast engine for the specific location. In addition, very short-term weather forecasts may be generated by the observation/forecast engine from a blend of inputs from the plurality of forecasting techniques. An output system is provided for outputting one or both of the real-time synthetic meteorological conditions and/or the very short-term weather forecasts.

According to another aspect of the invention, the observation/forecast engine further comprises: a current conditions engine for determining real-time synthetic meteorological conditions for the specific location; and a forecast engine for determining a blend of inputs from the plurality of forecasting techniques. The real-time synthetic meteorological conditions are for the time of about t=0, and the very short-term weather forecasts are for a time period of about t=0 to about t=6 hours.

According to another aspect of the invention, the very short-term weather forecasts further comprise a blend of: a first estimate of meteorological quantities derived from real-time weather data and forecast information; the first estimate adjusted using knowledge of nearby human-driven forecasts and a downscaling technique based on knowledge of climatological gradients or microclimatological relationships of the meteorological quantities in the vicinity of the specific location; a second estimate for the meteorological quantities derived from predicted radar images and lightning density forecasts that match a valid forecast time; and calibration scores for a set of nearest neighbors of the specific location, wherein the calibration scores are used to determine the blending of the first and second estimates of meteorological quantities.

According to another embodiment of the invention, a method for deriving very short-term weather forecasts at a predetermined location is provided. The method includes receiving very short-term weather forecast data inputs. Next, the method estimates first very short-term meteorological quantities at the predetermined location from the very short-term weather forecast data inputs. This estimate may be adjusting by interpolating corrections in accordance with weather conditions at nearest neighbors to the predetermined location. Next the method estimates second very short-term meteorological quantities at the predetermined location from corresponding future radar data and future lightning density forecast that matches the valid forecast time. Calibration scores corresponding to the first and second weather conditions estimates may be retrieved from a set of neighbors to the predetermined location. The method may use the calibration scores to determine a blending of the first and second weather conditions estimates to determine very short-term weather forecasts. The method may output the very short-term weather forecasts for use by a user or another system.

The method may also include determining real-time synthetic meteorological conditions. In such a combination method, the method may distinguish between a system run that produces very short-term weather forecasts and a system run than produces real-time synthetic meteorological conditions.

According to another aspect of the invention, receipt of the very short-term weather forecast data inputs may further comprises: receiving a forecast of radar imagery comprising a high-resolution radar image of reflectivity and precipitation type representing a prediction of the state of the precipitation filed over the predetermined location for predetermined time intervals between a desired forecast valid time period; and receiving periodic weather forecasts created for the predetermined location using numerical weather prediction and statistical guidance as a first pass, human forecaster intervention, and a post-process churning of the digital outputs such that the final forecasts are consumable to weather forecasters.

According to another aspect of the invention, the method may further include: comparing a corresponding pair of weather conditions comprising an estimated weather condition and an observed weather condition, wherein the corresponding pair of an estimated weather condition and an observed weather condition have a time step coincident; deriving a set of calibration scores from the comparison; and calibrating the very short-term weather forecasts using the calibration scores. The estimated weather condition may include future radar predictions and the actual weather condition may include actual radar observations.

According to another aspect of the invention, the method may improve computing efficiencies by: externalizing or separating the calibration; and only performing the calibration when at least one neighbor observation experiences a subsequent update.

According to yet another aspect of the invention, the method may further include: determining an average error or variance of the estimated weather condition for each target point or grid point given a set of nearest neighbors; aggregating individual scoring events for various forecasting techniques to compare a current performance of the estimated weather condition to the observed weather condition; and addressing a versioning or age of the estimated weather condition as well as the valid time of the estimated weather condition.

According to yet another aspect of the invention, the method may further include: partitioning the averaging of the estimated weather condition errors into scoring categories in order to find distinct average forecast errors or variances for different valid time regimes of the very short-term forecast; and communicating the average errors to the very short-term forecasting process. Partitioning of the averaging of the estimated weather condition errors may be made, for example, into scoring categories comprising: forecasts between about 0-2 hours into the future; forecasts between about 2-4 hours into the future; and forecasts between about 4-6 hours into the future.

The method may allow the partition scores to change more gradually over time by: keeping knowledge of previous scores; and weighing the knowledge of previous scores along with newly computed scores. The method may provide for building a database or table of near-real time error scores or calibration scores based upon the receipt of individual observed weather conditions; and comparing the received observed weather condition to recent estimated weather conditions that are valid for approximately the same time. Further, the method may provide for computing appropriate weighs for the first and second weather conditions estimates; and using the weights to determine the blending of the first and second weather conditions estimates in order to derive very short-term weather forecasts.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. Included in the drawing are the following Figures:

FIG. 7 is a table comparing a mode for estimating real-time synthetic meteorological conditions and a mode for performing very short-term weather forecasting.

DETAILED DESCRIPTION OF ILLUSTRATIVE EMBODIMENTS

The following is a description of several exemplary embodiments of systems and methods to derive and produce very short-term weather forecasts in the 0-6 hour timeframe. The systems and methods receive inputs of high-resolution weather data and forecast information, manipulate that data/information and produce high spatial and/or temporal resolution weather forecasts in the short-term period of 0-6 hours. As used herein, the term very short-term includes the time period or timeframe of about 0 to about 6 hours from the current time of system execution. As used herein, the term high-resolution includes horizontal detail or output on a regularly spaced grid that contains grid intersections with a maximum of 5 km spacing and temporal resolution that includes explicit outputs every 15 minutes or less.

The present invention includes expert systems and methods that may employ a blend or hybrid of very short-term weather forecasting approaches, with intelligent arbitration of the different forecasting techniques (e.g., numerical, statistical, and human-driven techniques) to provide an improved methodology to solve problems typically associated with weather forecasting for very short-term time intervals such as, for example, the timing of the onset of precipitation, timing of the departure of precipitation systems, the accurate spatial and temporal evolution of precipitating systems, and the intensity and type or character of such precipitating systems. The arbitration may be predetermined and/or may include dynamic arbitration of the different numerical, statistical, and human driven techniques. The present invention provides high-resolution short-term forecasts of incomparable accuracy or skill when compared to any public or privately-sourced alternative.

Figure 3:
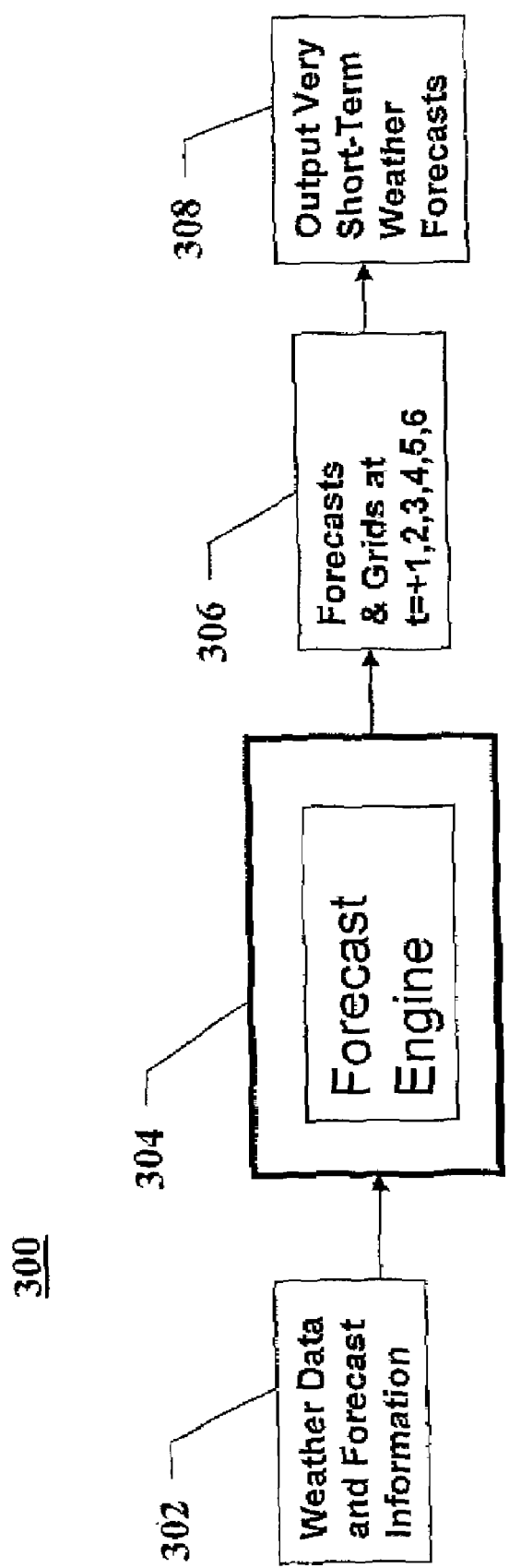
FIG. 3 shows an exemplary system for producing high-resolution, very short-term weather forecasts.

FIG. 3 shows an exemplary system for deriving and producing high-resolution, very short-term weather forecasts. As shown in FIG. 3, the very short-term forecasting system 300 (also referred to herein as "expert system") includes weather data and forecast information inputs 302 that may be accessed or received by a forecast engine 304. Forecast engine 304 may include a processor/server for dynamic and intelligent arbitration of one or more numerical, statistical, and/or human driven techniques and/or of the weather data and forecast information inputs 302. The forecast engine 304 may select the most appropriate technique or blend of forecasting techniques based upon, for example, the input weather data and forecast information, the desired weather parameter(s) or condition(s) that is/are being forecasted, a given weather situation or regime, forecast valid times, the geographic region or location under scrutiny, etc. The forecast engine 304 derives weather forecasts 306 of various weather parameters and/or meteorological conditions for the very short-term. The derived weather forecasts may include gridded data at forecast valid times into the future 306. The very short-term weather forecasts may be output to an output system 308. The output system 308 may include a visualization system, a display, a web-site, a lexical parser that transforms the gridded forecast output into words and sentences that describe the Nowcast, an input interface to another system, a database for storing the very short-term forecasts, and the like.

The systems and methods for deriving and producing very short-term weather forecasts possess a number of improved or beneficial characteristics, including, but not limited to:

1.) The systems and methods work at very high-resolution in time and/or space;
2.) The systems and methods are rigorous in their treatment of precipitation and precipitating systems, with the ability to discriminate between precipitation type, intensity, and morphology of the precipitation; and
3.) The systems and methods may include internal and objective calibration or self-adjustment.

For example, exemplary systems and methods for estimating real-time (or current) meteorological conditions may arbitrate two distinct and semi-independent estimates of the current or present weather conditions. One of these methods is ground-based or driven by ground observation while the second is remote-sensing based and is driven by weather radar information. The specific blend of these two methods (i.e., forecasting approaches or techniques) is dependent in part on the correspondence of the second of these methods to actual ground truth at some point in time and space. This is wholly consistent with the notion of an expert system for forecasting weather in the 0-6 hour timeframe. That is, a very short-term weather forecasting system capable of adapting or synthesizing to many different regimes or permutations through learning or training based on experience over time.

Figure 1:
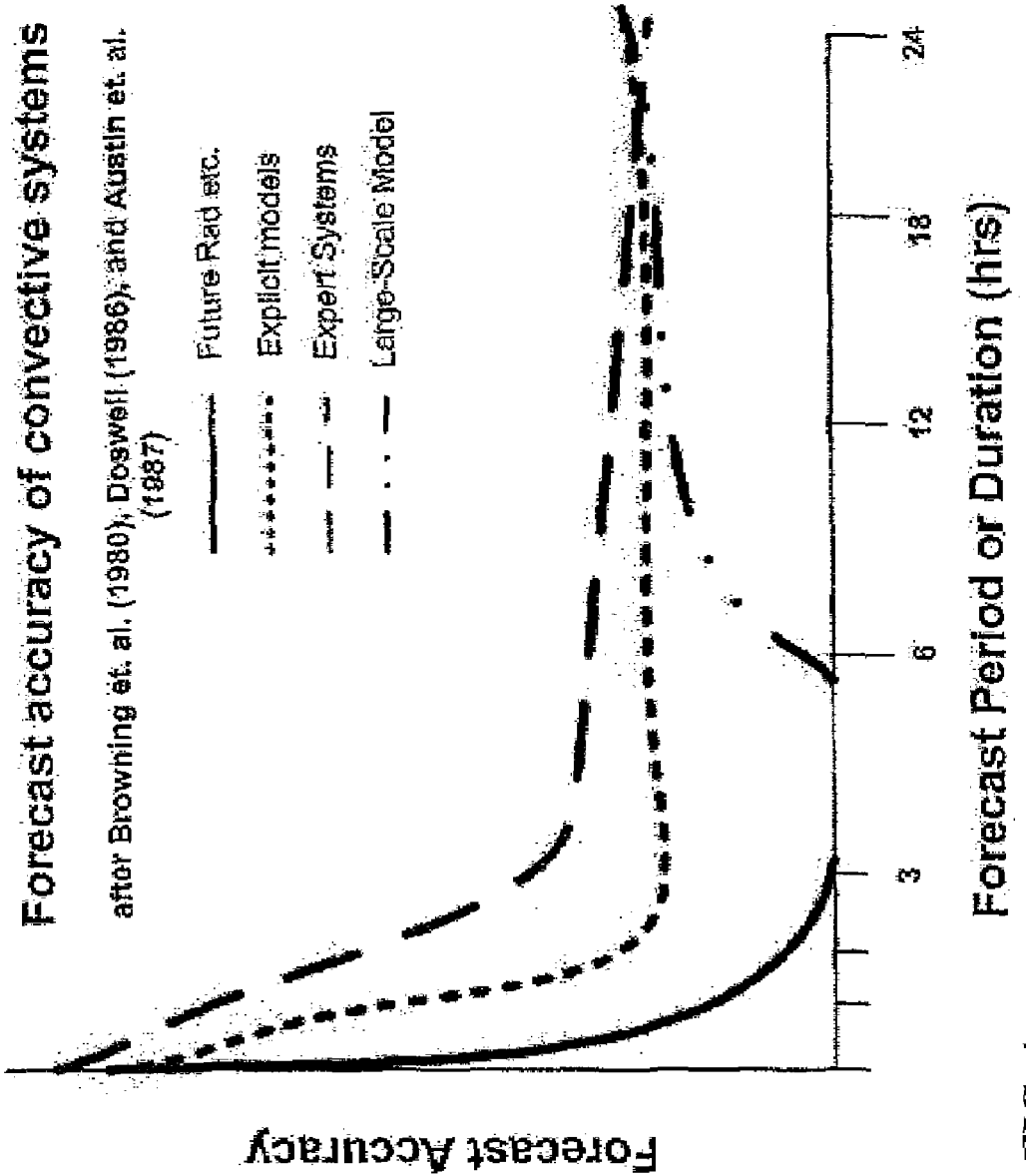
FIG. 1 is a graph illustrating the short term forecast skills or accuracy for different very short-term weather forecasting techniques.
Figure 2:
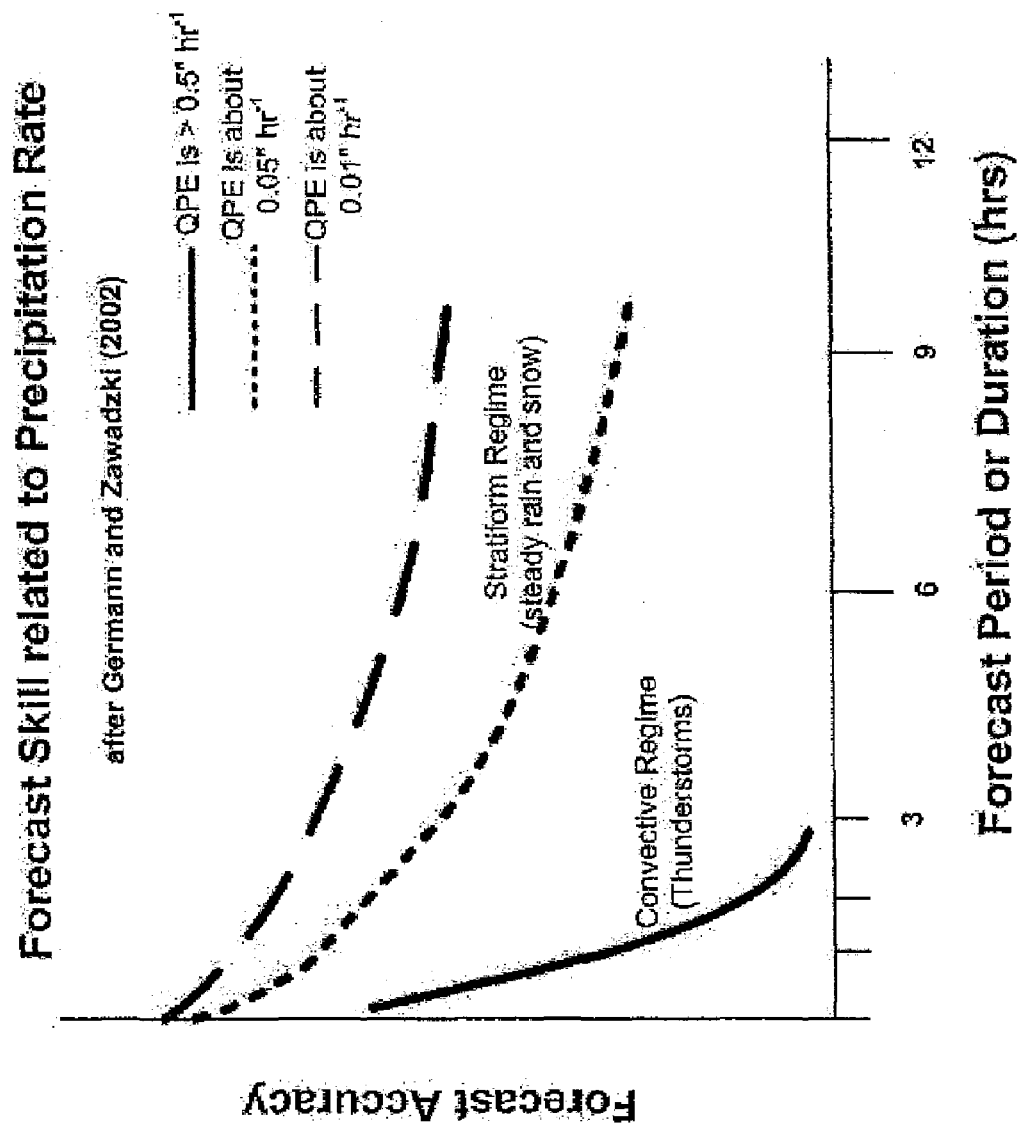
FIG. 2 is a graph illustrating a rough comparison of short term forecast accuracy comparing precipitating systems based upon their average precipitation rates or Quantitative Precipitation Estimates (QPE) or Forecasts (QPF)

Referring back to FIG. 1, expert systems (i.e., systems for deriving very short-term weather forecasts according to embodiments of the present invention) employing, for example, a hybrid approach and/or involving some blend or combination of forecasting techniques, such as models, extrapolation, human control, and/or computer decision support (such as Neural Net), show improved forecasting, especially for the very short-term time period of 0-6 hours. With reference to FIG. 2, expert systems also show improved forecast accuracy in the very short-term time frame for different types of precipitation systems and/or precipitation rates.

Figure 4:
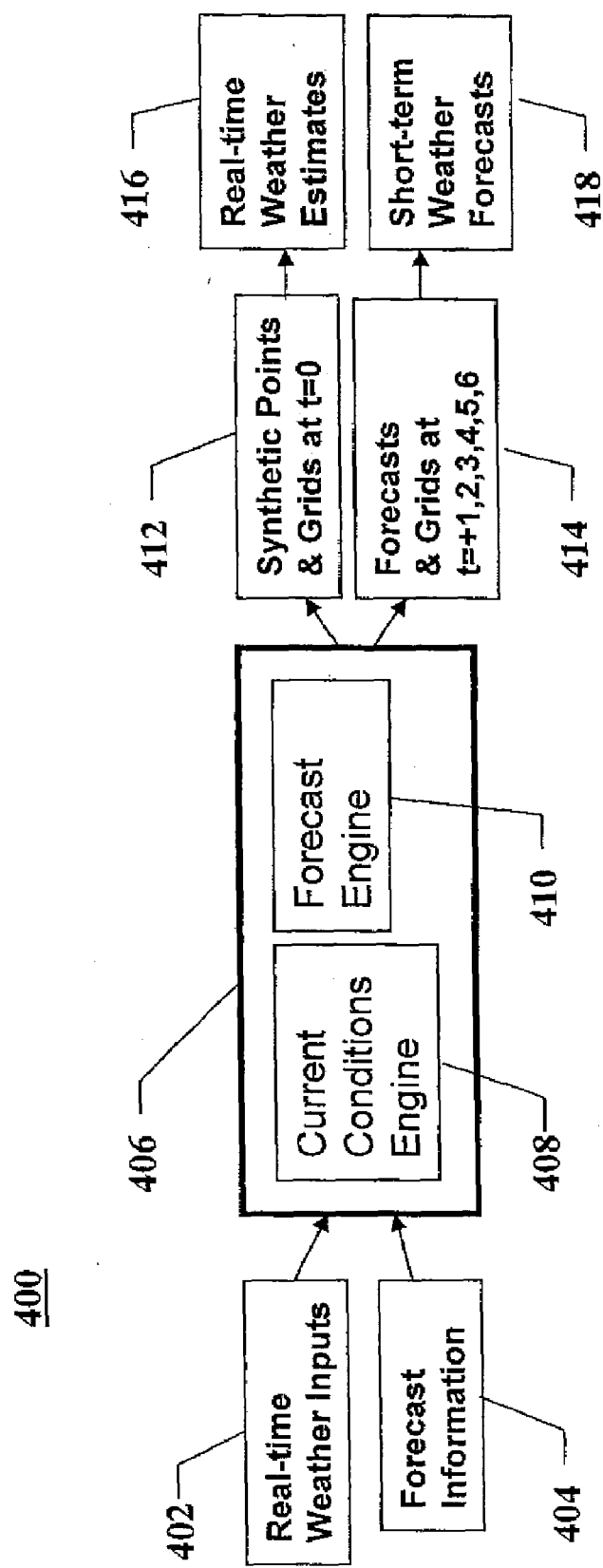
FIG. 4 shows an exemplary combination system for producing high-resolution, real-time synthetic meteorological conditions and high-resolution, very short-term weather forecasts.
Figure 5:
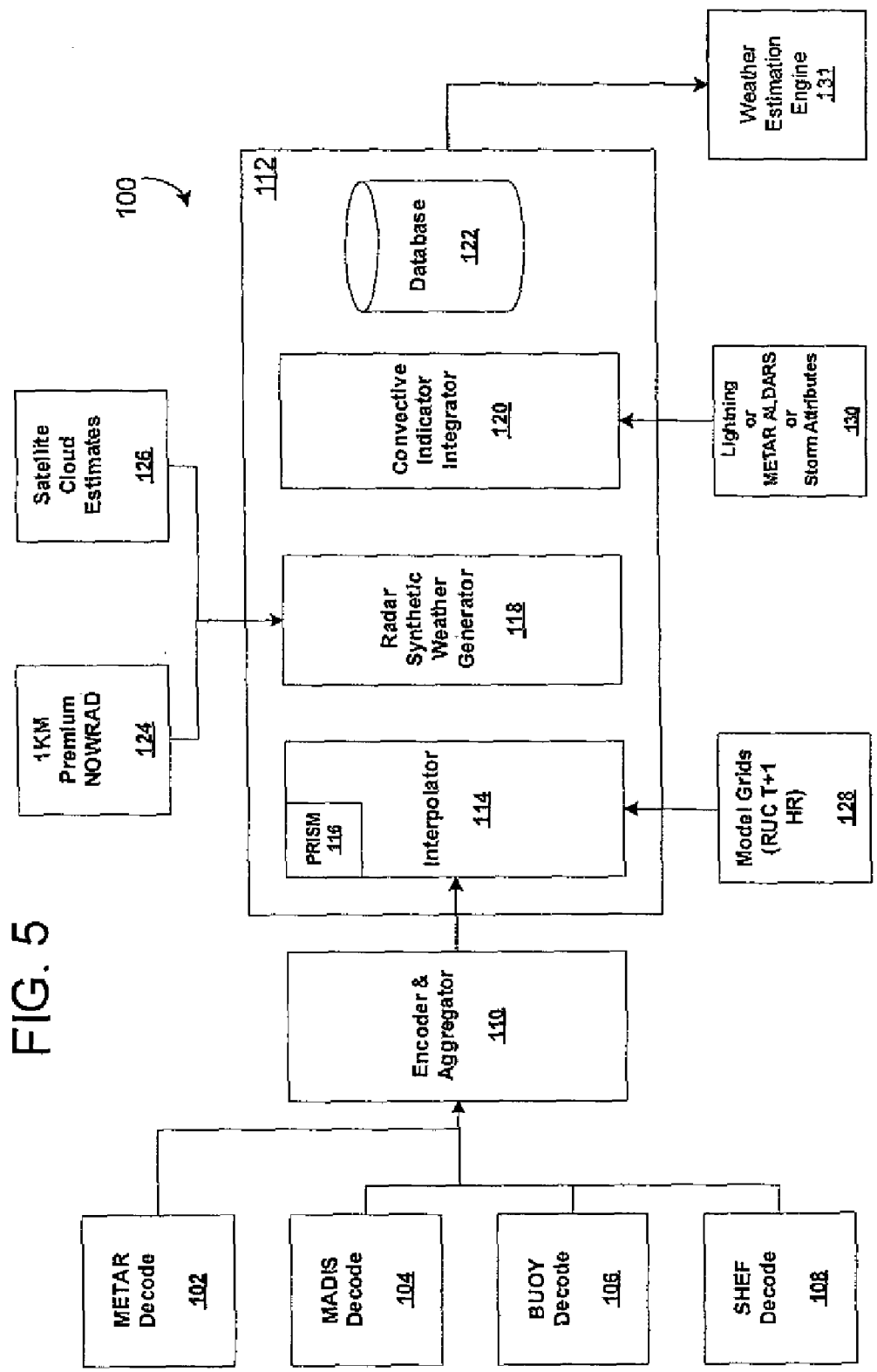
FIG. 5 shows additional details of an exemplary system for producing high-resolution, real-time synthetic meteorological conditions.
Figure 6:
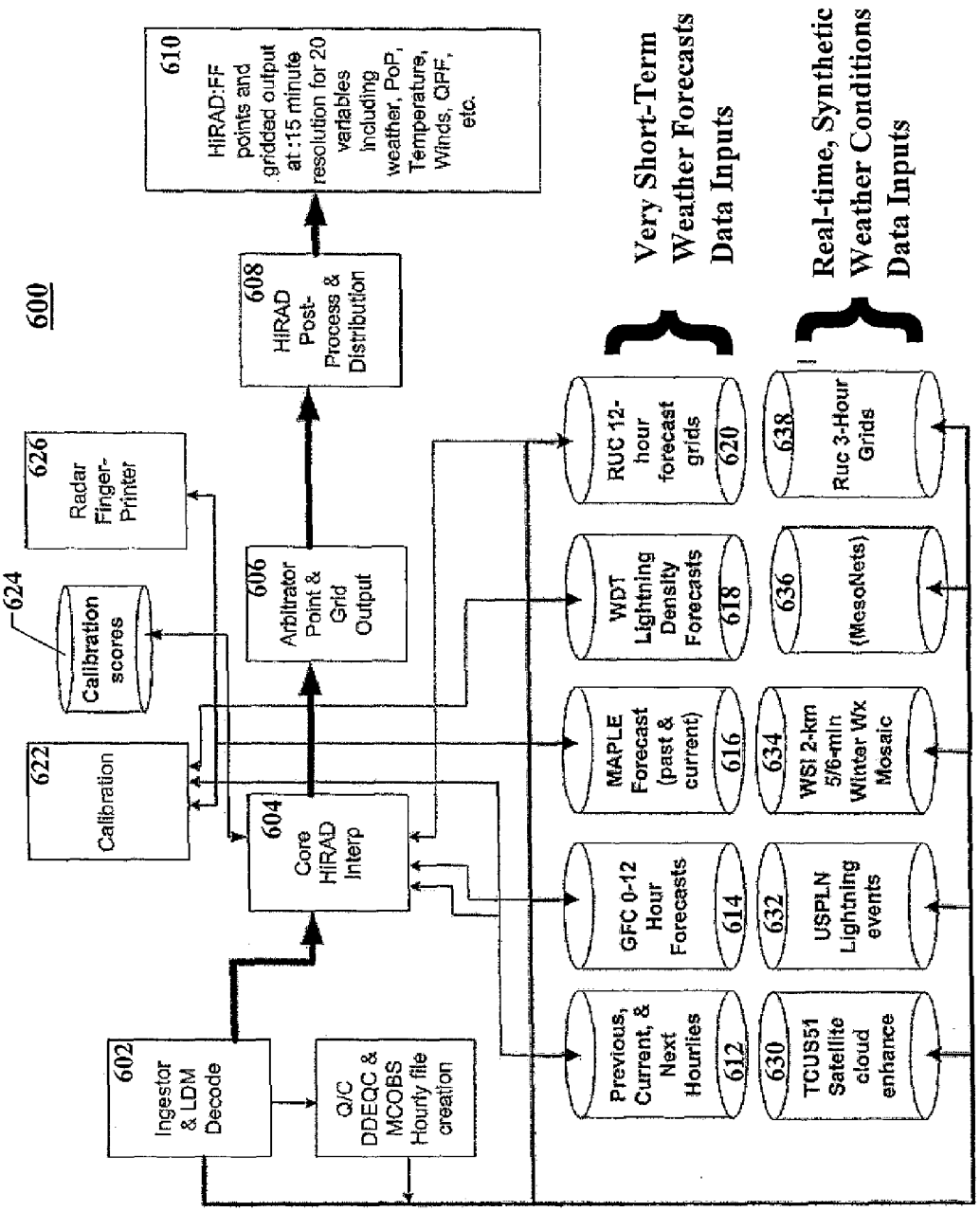
FIG. 6 is a schematic showing data flows for deriving very short-term weather forecasts, as well as real-time synthetic meteorological conditions.

As described above, the present invention for producing very short-term weather forecasts may be a stand-alone system/method (as shown in the exemplary embodiment of FIG. 3) or may be implemented in combination with systems and methods for producing high-resolution, real-time synthetic meteorological conditions for a specific location (as shown in the exemplary embodiment of FIGS. 4 and 6). Details of systems and methods for estimating or deriving real-time synthetic weather observations/conditions for any given location, including locations between official measuring/reporting stations, are described below with respect to FIGS. 4-6 and are also provided in related application Ser. No. 11/372,717, filed Mar. 10, 2006 and related application Ser. No. 11/042,681, filed Jan. 25, 2005 (now U.S. Pat. No. 7,082,382); both of which are incorporated herein by reference in their entirety.

FIG. 4 shows an exemplary combination system for producing high-resolution, real-time synthetic meteorological conditions and/or high-resolution, very short-term weather forecasts. As shown in FIG. 4, the combination system 400 may include inputs including real-time weather inputs 402 and weather forecast information 404. Inputs 402, 404 may be accessed or received by an observation/forecast engine 406. As shown, the observation/forecast engine 406 includes a current conditions engine 408 and a forecast engine 410. The current conditions engine 408 and forecast engine 410 may be separate processors/servers or may include a single processor/server. The observation/forecast engine 406 may derive real-time synthetic meteorological conditions 412 (i.e., t=0 or time is "now") and/or very short-term weather forecasts 414 (i.e., t=+1, 2, 3, 4, 5, 6 hours or future valid forecast times at some temporal resolution or time-step). The real-time synthetic meteorological conditions 412 may be output/produced as real time weather estimates 416. The very short-term weather forecasts 414 may be output/produced as short-term weather forecasts 418.

FIG. 5 shows additional details of an exemplary system for producing high-resolution, real-time synthetic meteorological conditions for a specific location. As shown in FIG. 5, weather observations/conditions for any specific location may be estimated or derived using observed weather conditions from neighboring locations, radar data, lightning data, satellite imagery, etc. An initial estimate of weather conditions for a location may be made based on a downscaling process using the current conditions at the neighboring locations. A measure of corroboration between the radar data and surface weather conditions at official observing stations may be established. Through the results of the downscaling process, radar calibration statistics and estimates of ground-based precipitation, the corroboration can be iteratively tuned, resulting in a weather conditions vector containing associated meteorological fields or quantities for locations that lie between or around the sparse network of official observing sites from which an estimate of the weather conditions may be made.

Referring to FIG. 5, there is illustrated a high-level overview of a system for producing high-resolution, real-time synthetic meteorological conditions. The system 100 ingests the NWS, DOD, or FAA weather observations, which number approximately 1,500 within the conterminous United States (CONUS). Inputs to the system include METeorological Aerodrome Report (METAR) data 102, Meteorological Assimilation Data Ingest System (MADIS) data 104, BUOY data 106, and Standard Hydrometeorological Exchange Format (SHEF) data 108. Those of ordinary skill in the art will fully appreciate the input data sets and the information contained therein. Also, the present invention may use additional or fewer inputs, as necessary. The data inputs are input to an encoder/aggregator 110 which then outputs the data to an observation engine 112.

The observation engine 112 shown in FIG. 5 processes the aggregated and encoded data through various calculations (e.g., interpolator 114, radar synthetic weather generator 118, convective indicator integrator 120) to determine an estimated surface weather observation for a location, and stores the result in a database 122. The calculations made by processes 114, 118 and 120 may use PRISM high resolution climatology 116, NOWRad data 124, satellite cloud estimates 126, Rapid Update Cycle (RUC) data 128, and lightning or METAR Automated Lightning Detection and Reporting System (ALDARS) or storm attribute data 130 as part of their determination. The engine 112 outputs a weather conditions vector, containing associated meteorological fields for the selected location to a weather estimation engine 131. The weather conditions vector, described below, is then used to estimate weather conditions at a selected location.

FIG. 6 is a schematic showing an exemplary combination system and data flows for deriving and producing very short-term weather forecasts in the 0-6 hour timeframe, as well as estimates of real-time current or present weather conditions. As shown in FIG. 6, weather data, including real-time weather data and high-resolution forecast information, may be stored in a database(s).

As illustrated in FIG. 6, the solid thick arrows represent exemplary processing flow through the system; medium weight arrows indicate exemplary data storage; and thin arrows represent exemplary exchange between program processes and storage for real-time synthetic weather conditions systems and very short-term weather forecasts systems.

The real-time synthetic weather condition system may run periodically, such as for example, twice hourly at :05 and :30 minutes after each hour of the day. However, the ingestor & LDM decode 602 may run continuously to monitor the arrival of real-time weather input data and imagery from asynchronous or continuous real-time public and private data sources. The ingestor 602 may read, decode, and store the following inputs for systems for deriving very short-term weather forecasts:

1.) Previous, Current, and Next Hourlies 612 represent observations from the network of official ASOS and AWOS National Weather Service (NWS) observing platforms in the METAR format. These observations may be decoded into an intermediate format and stored in hourly collection tables called the Previous, Current, and Next Hourlies 612 that may be used by the system Interpolation 604 process and the system Calibrator 622 and the system Fingerprinter 626.

2.) GFC 0-12 Hour Forecasts 614 represent hourly tabular forecasts of temperature, wind, weather and other parameters that may be sourced from, for example, The Weather Channel's human-driven forecast operation (called the Global Forecast Center or GFC). The forecasts may be issued up to 22 times daily, and the system Ingestor 602 may be capable of reading any of these forecast releases or amendments. The forecast quantities generated round the clock by GFC may be transformed to appear as observations for the benefit of the real-time, synthetic weather condition system. That is, fields such as Forecast Weather may be translated to appear as Present Weather and may conform to the codes and definitions of allowable Present Weathers as understood by the real-time, synthetic weather condition system. For example, an hourly forecast of Scattered Showers will be converted to a Present Weather of Rain Showers for the purpose of the real-time, synthetic weather condition process.

3.) MAPLE Forecasts 616 may comprise predicted radar images at 1-km resolution spanning CONUS and nearby territories. MAPLE forecasts may be issued twice hourly with about 10 minutes latency or time lag. That is, the MAPLE forecast might be valid for a period between 1200Z (12:00 Greenwich Mean Time or Zulu time) and 1800Z and may arrive in the system about 1210Z. The MAPLE forecast images may have a temporal resolution of 15 minutes, therefore 25 MAPLE predicted radar images would comprise a single MAPLE forecast release and cover a forecast valid period that spans six hours into the immediate future.

4.) WDT Lightning Density Forecasts 618. The lightning density forecasts may be 1-km gridded predictions of lightning flash density in strokes per unit time. They may be issued at identical times compared to the MAPLE radar forecasts, and may have identical temporal resolution, and latency. The lightning density may be converted to an unconditional probability of thunder for use in the system for deriving very short-term forecasts since the real-time, synthetic weather condition system also uses this probabilistic form of lightning and thunder. The transformed probability of thunder may be the source of data that may be used to discriminate if falling precipitation (normally rainfall) is also accompanied by thunder and lightning. For example, this determination may result in a weather type of thunderstorm versus a determination of moderate or heavy continuous or showery rain.

5.) RUC 12-hour forecast grids 620. The Rapid Update Cycle (RUC) is a public domain dataset of the NWS Numerical Weather Prediction (NWP) model that runs operationally at the National Center for Environmental Prediction (NCEP) which is part of the National Weather Service. The RUC weather forecast model information may be used in the real-time, synthetic weather condition system to supply first guesses to meteorological quantities such as temperature, wind speed, and quantitative precipitation estimate. These initial estimates may be refined using knowledge of the ground observations in the real-time, synthetic weather condition system or, analogously, may be refined using knowledge of the GFC forecasts or prediction of these same quantities in the forecast embodiment of the system. In both cases, high-resolution climatological information (PRISM gridded climatology) may be used to then further downscale the results to an arbitrary location or point.

Systems and methods for providing very short-term weather forecasts provide forecasts or Nowcasts about 6 hours into the future or beyond the current time, compared with systems and methods for estimating current weather conditions, which provide information at the current time only. As a consequence of this 6 hour forecast window, the RUC model grids used as input to very short-term forecasts system may provide coverage for this period (i.e., 0-6 hours time period). In an exemplary embodiment, the current conditions system may use hourly RUC forecasts from, for example, 0-3 hours into the future. The very short-term forecasts system may require RUC forecasts further out into the future, such as for example, from 0-9 hours into the future. The NCEP runs the RUC model once hourly, and produces forecasts that are 12 hours into the future at a temporal resolution of one hour.

Thus, the system Ingestor 602 may be responsible for the intake of a number of different datasets, and these datasets may include future information about the state—or more correctly—the predicted state of the atmosphere near the earth's surface within the CONUS. The future datasets may be thought of as analogs to the current datasets used in the current conditions system. For example, the MAPLE forecast is an analog of the WSI 1 or 2-km 5 to 6 minute Winter Weather Radar Mosaic; the WDT Lightning Prediction dataset is an analog of the USPLN Lightning events dataset; etc.

Each of the system forecast analogs may fulfill the current conditions system's input requirements to perform its processing tasks at the desired time. In practice, the combined system will not have to distinguish between a system run that produces current conditions and one that produces future weather forecasts. The system may manipulate the required inputs such that they are in agreement with the desired current or future time state requested in any specific system run.

While data ingestion takes place, the system radar calibration continues to run "out of band." The Calibrator 622, as described herein below, collects future radar predictions provided by the MAPLE subsystem 616 and compares these with newly arriving observations. The resulting analyses produce calibration scores 624 or error statistics at each known observation site. These statistics may be stored, and may subsequently be shared during each scheduled run of the very sort-term forecast system.

If one follows the exemplary process (represented by the heavy solid line across FIG. 6), there are four distinct processing stages that take place. A single system run for deriving very short-term forecasts may involve a single time step (e.g., at 15 minute resolution) of the 6-hour forecast interval for all grid point intersections (e.g., at 5 km resolution) about a rectangular domain that circumscribes the CONUS. Therefore, in the illustrated example, 24 individual runs may be necessary to complete the entire range of Nowcast time steps. The four fundamental processing steps include:

1.) Ingestion and Quality Control (Q/C) 602 of the very short-term forecast system inputs, as described above.

2.) The core system Interpolation 604 that provides an estimate of about twenty very short-term forecast system quantities at all grid point intersections, using the punctual kriging interpolation method described in detail in parent application Ser. No. 11/372,717, filed Mar. 10, 2006 and Ser. No. 11/042,681, filed Jan. 25, 2005 (now U.S. Pat. No. 7,082,382). That is, an initial first guess is made of the meteorological quantity using grid extraction from the RUC 0-12 hour NWP output. This first guess is adjusted from knowledge of a number of nearby GFC hourly forecasts corresponding to this same point in time (so-called nearest neighbor analysis). The final adjustment may be made using a downscaling technique based upon knowledge of the climatological gradients or microclimatological relationships of that quantity in the vicinity of the target grid point. This establishes the derived quantity of the "surface-based" first method (hereinafter referred to as "Method I").

A second method (hereinafter referred to as "Method II") estimate for the proscribed quantity, as in a current conditions system, may be produced by the radar Fingerprinter 626 (described in detail in Ser. No. 11/021,801, filed Dec. 22, 2004, "Producing High-Resolution, Real-Time Synthetic Meteorological Conditions From Radar Data"; which is incorporated herein by reference in its entirety). The radar Fingerprinter 626 finds a corresponding future radar image from the MAPLE subsystem and future lightning density forecast that matches the valid forecast time. From a small spatial sub-domain of the predicted radar reflectivity, radar-based precipitation type, and lightning probability fields the radar Fingerprinter 626 produces an estimate of the target quantity, and returns this estimate to the core system Interpolator 604.

The system may then retrieve the most recent or the currently known Calibration Scores 624 from the set of neighbors of the target point or grid point intersection. These neighbors may be defined statically using Geographic Information Systems processes may be determined dynamically from consideration of proximity, availability, and/or covariance r relationship with the target point.

3.) The Method I, Method II, and Calibration Scores 624 are passed along to the system Arbitrator and Grid Output Generator 606. Here the calibration scores are used to determine the blending of Method I and Method II estimates. From these inputs and a large set of processing and processing exception rules, the final derived quantity for the forecast time step, and for this individual target point may be produced.

4.) In the system post-process and distribution step 608, the system output goes through final quality-control checks, may be converted to imperial units, and may be output in a number of specified output formats to downstream content or publishing systems that await or listen for this real time forecast datastream, at step 610.

In the case of deriving very short-term weather forecasts, an expert system may be extended to applications resulting in a prediction or estimate of the future state of the atmosphere. To accomplish this in a combination system, such as the system illustrated in FIG. 6, additional modification may be made to the software engine of an existing system for estimating current conditions (e.g., observation engine 112 of FIG. 5) or a new forecast engine may be provided (see e.g., FIG. 4), as well as an addition of new inputs to the system (see e.g. FIGS. 4 and 6).

FIG. 7 shows a table comparing the salient performance and input requirements of an exemplary combination embodiment of the present invention. A combination system may provide for derivation of synthetic, real-time present or current weather conditions and derivation of very short-term weather forecasts. The first column 700 of FIG. 7 includes exemplary inputs/sources of weather data and forecast information. The second column 702 of FIG. 7 shows exemplary information derived for a synthetic real-time observation or current conditions system and the third column 704 identifies exemplary inputs and performance metrics for an exemplary very short-term weather forecast system.

As shown, the exemplary very short-term weather forecast system may output gridded forecasts at 5 km resolution over the identical domain as the system used for current conditions. The runtime requirement may be extended to 12 minutes compared to 5 minutes for the current conditions system. The illustrated very short-term forecast system may output 20 variables versus 25 for the current conditions system. The short-term weather forecast system may produce its 5 km resolution output for 25 distinct time steps representing forecast valid times between about 0 and about 6 hours into the future at a temporal resolution of fifteen minutes. The lower resolution of grid spacing, the fewer number of output variables, and the longer run time are exemplary and may change based on considerations such as hardware and/or raw computing bandwidth requirements and the like. For example, grid resolution is quadratic in terms of computing resource requirements so reduction of grid resolution by a factor of two reduces the total number of grid intersections or explicit grid computations by a factor of four.

In FIG. 7 the system inputs between the current conditions mode and the forecast mode are compared. Some additional information is provided below:

Radar versus MAPLE—In a current conditions system, radar imagery may be provided by a high resolution mosaic or radar composite of CONUS-based reflectivity that includes a depiction of precipitation type. In a short-term forecast system, the single radar composite representing the current or present time may be transplanted by a radar forecast called MAPLE. MAPLE forecasts are expressed in the form of a high-resolution radar image of reflectivity and precipitation type. The MAPLE domain may be nearly identical to that provided for in the radar composite of a current conditions system. However, for an individual MAPLE forecast there may now be 25 frames of radar imagery representing a prediction of the state of the precipitation field over CONUS for 15 minute time steps between 0 and 6 hours into the future.

METAR Observations versus GFC Forecasts—These are hourly weather forecasts created for stations within the CONUS around the clock in, for example, The Weather Channel's Global Forecast Center (GFC). The forecasts may be created through an end to end process that includes numerical weather prediction and statistical guidance as a first guess, a significant amount of human forecaster intervention, and a post-process churning of the digital outputs such that that the final forecasts are consumable to weather forecasters, providers and internal partners. The GFC hourly forecasts may act as a surrogate for METAR observations in terms of system processing. That is, the GFC hourly forecasts may be transformed to a format that is fully compatible with the observation collectives currently used by systems for estimating real-time current conditions. The surrogate observations generated may therefore be used to systematically produce an error field that represents the difference between model derived first-guesses of the surface variables and these surrogate observations.

Just as real observations nudge the RUC first-guess field towards reality in a current conditions system, the GFC forecasts may act in the same manner. This interaction also has the desired effect of introducing a human-driven component to the expert system's short-term forecast process. However, it is noted that the differencing of RUC and GFC forecast or surrogate observation may not be strictly equivalent. In one case, the RUC is compared to actual measured observations. In a short-term forecast case the RUC may be compared to a distinct or unique opinion of what the weather might do in the coming 0-6 hours—and not the true state of ground conditions since this is an unknown future state. This will, however, have the effect of blending or ensembling the two diverse versions of the forecast from RUC (model-derived) and GFC (human-derived) forecasts and should result in a more skillful outcome compared to evaluating each separately.

Lightning Scorecard versus Lightning Prediction—In a current conditions system, lightning may be transformed into a lightning probability by analysis of the high resolution field of actual lightning strikes, for example, 0 to 10 minutes prior to the system runtime. In a short-term forecast system, a series of lightning probability or lightning density forecasts may be received, for example, at 15 minutes resolution extending 6 hours into the future. These gridded lightning predictions may also be transformed into the appropriate lightning probability that lead to discrimination of weather conditions that include or do not include lightning and thunder.

Satellite—The satellite information for mid and high-level cloud coverage used, for example, in a current conditions system may augment ground observations of cloud cover that are limited to below 12,000 feet above-ground for automated sensors. Suitable equivalents of satellite information may be used in a very-short-term forecast system.

Rapid Update Cycle (RUC)—The short range NWP model used in a current conditions system may also be used in a very short-term forecast system. However, in a very short-term forecast system, a larger number of time steps may be needed from the RUC model output to accommodate the forecast window that may be projected 6 hours into the future.

In terms of software adaptation for a combination system, such as the example shown in FIG. 6, the system may run a single time step for the entire spatial domain of CONUS. This time step may be understood to be one of the exemplary 25 time steps that comprise the 6 hour window of the forecast. All inputs should correspond as closely as possible to this time step or be interpolated temporally to correspond to this time step. The system may perform temporal interpolation for inputs that may be limited to, for example, hourly resolution. Preferably, all inputs in a combination system have the same temporal resolution, such as for example, a minimum hourly resolution.

Another adaptation of a synthetic, real-time current conditions system to a very short-term forecast system involves the calibration of the radar fingerprinter. An exemplary calibration process is addressed herein below. FIG. 6 and the text above relating to that figure describe the basic data flows through an exemplary combination system for deriving synthetic, real-time current conditions and deriving very short-term weather forecasts. A list of minor adaptations that may exist between a system for deriving synthetic, real-time current conditions and a system for deriving very short-term weather forecasts include:

Outputs from a system for deriving very short-term weather forecasts may be expressed in terms of point and gridded data. Accordingly, fields such as, for example, 24 hour precipitation accumulation, and pressure tendency need not be produced with a system for deriving very short-term weather forecasts since quantities are oriented around current conditions. The gridded data may be limited to, for example, 20 individual fields versus 25 in a system for deriving synthetic, real-time current conditions. Preferably, the layout of the point data output record is flexible and may be adapted to the particular application.

As described, the GFC forecasts may be collected and transformed into a form that is compatible with the existing current conditions engine without losing the meaning or intent of the forecast information. Moreover, there are many more GFC forecast points available (approximately $10^4$ compared to 103 official observations). The number of forecast points used in variational analyses may vary depending on the application. The combinatorial system's performance may be sensitive to the number of observations for the current conditions system and may be sensitive to a number of forecasts used in the very short-term forecast system, since these are analogs of one another.

The GFC forecast inputs may forego much of the elaborate quality-control (q/c) filters that act upon ground observations. Simple q/c rules must still be in place, but sophisticated filters may not be needed for the GFC forecast data. However, observations may be used for radar calibration or radar fingerprinter processes that are described below with respect to the calibration process. The creation of observation collectives organized by current, previous, and next hour intervals may continue unchanged and would also require full q/c attentiveness as exists in the current conditions version of the system.

The lightning processing may include an elaborate creation scheme to determine the point value of a probability of lightning or thunder. In a very short-term forecast system, gridded lightning prediction information may be used directly to produce point or grid-based probabilities, without the necessity for an elaborate spatial analysis of lighting frequency in the vicinity of a target point.

One difference between a system for estimating synthetic, real-time current conditions and a system for deriving very short-term weather forecasts is that the very short-term forecast system may require calibration of the radar fingerprint. The following describes an exemplary calibration that may be used with a system for deriving very short-term weather forecasts.

For any arbitrary point of interest, an estimate of real-time current condition subsystem may be responsible for one or more of:

1.) Ingesting and storing the current radar imagery in memory;
2.) Accepting a forecast vector and set of previously established nearest neighbor observation values (i.e., the nearest neighbors of the target point are already known to the system) of the Method I estimate from the central system calling program;
3.) Comparing these nearby observations with internal radar-based estimates of present weather for the same point in time and space as the nearby observation;
4.) Computing an average variance that represents the difference between the reported observations and the estimated observations of the nearby points;
5.) Estimating present weather for the point of interest itself at the current time;
6.) Using knowledge of the average variance to assign weights to the two distinct methods of estimating the current conditions at the point of interest; and
7.) Returning the final blended estimates of current conditions back to the central system program.

It is noted that the tasks performed in items 3 and 4 above are done each time the system performs a synthetic estimate of current conditions for a given point. In the gridded high-resolution version of the system, this nearest neighbor analysis comparing true observation to radar-estimations of current conditions takes place on the order of $10^7$ times per run. In most cases, the nearest neighbor analysis is needlessly computed; this is because:

The spacing of nearest neighbors is determined by the network of official observation points which presently number only about 1,500 in the CONUS. In most cases, the assemblage of neighbors for a single point is unchanged when one moves a single grid point in any direction. Thus, the average variance or error analysis would also remain unchanged in such cases.

Secondly, the frequency of nearest neighbor analysis for any given point is dictated by the arrival of new observations from the neighbors. This occurs on the order of once per hour for most official observing points. Since the system typically runs at sub-hourly intervals, a nearest neighbor analysis of variance will yield an identical result unless at least one neighbor observation experiences a subsequent update between the system runtimes.

Thus, one skilled in the art may appreciate that externalizing or separating the calibration tasks of the radar fingerprinter subsystem could lead to significant computing efficiencies if the calibration activity took place only when required and independent of the primary forecasting system.

Figure 8:
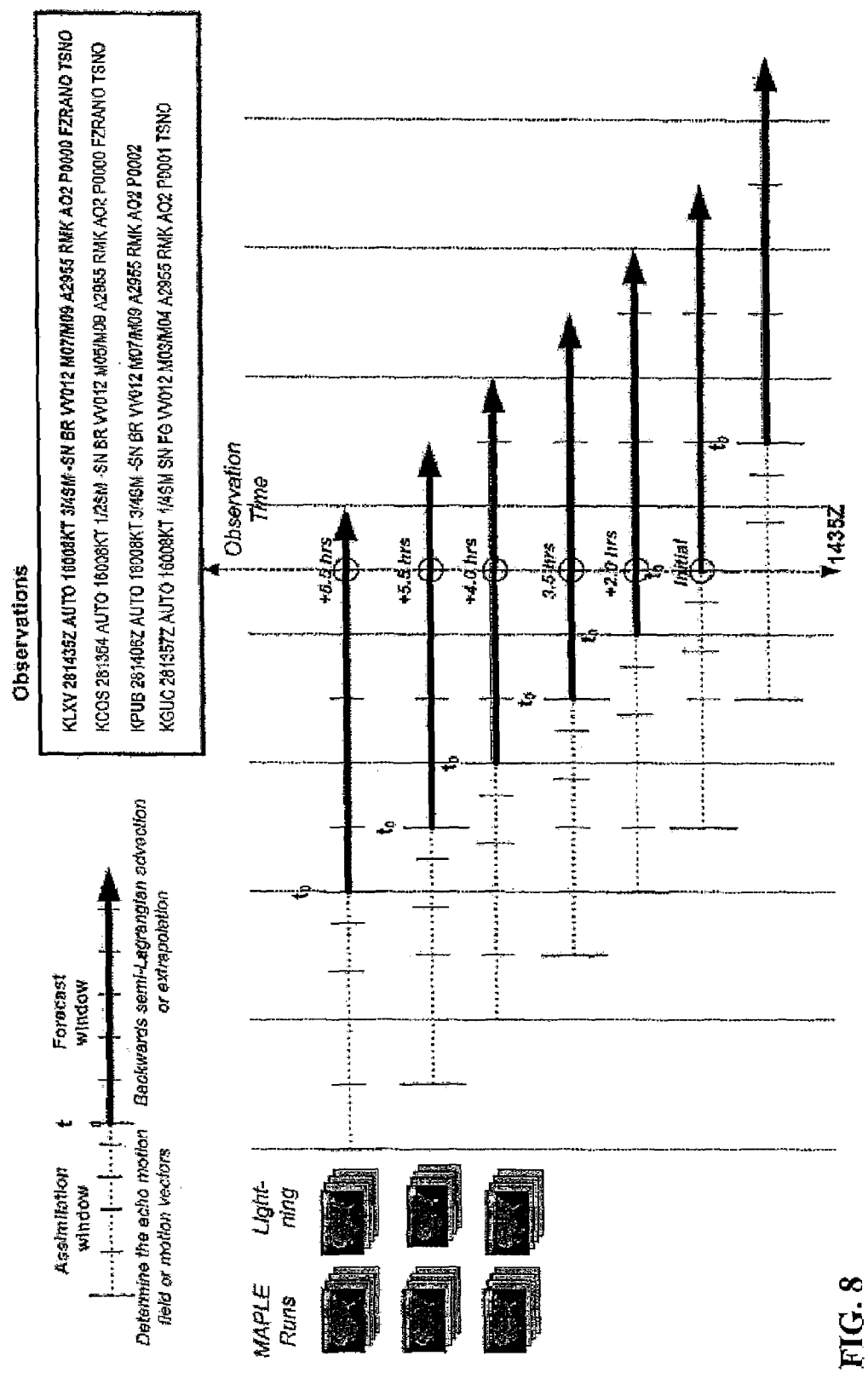
FIG. 8 illustrates an exemplary calibration process that may be used to more accurately predict or estimate the future state of the atmosphere for the very short-term.

As shown in FIG. 8, the Calibrator may use information from MAPLE and lightning prediction to estimate present weather at reported observation points in the CONUS. It is the arrival of a valid METAR that may trigger calibration to occur. In this example, KLXV reports at 1435Z and the Calibrator selects MAPLE and lightning imagery as close as possible to this observation time across all stored forecast sets. In each case, the Calibrator will compare its own internal estimate of present weather against the incoming METAR report; using sensible weather scoring, it will assign a variance or error to each comparison event. From this systematic comparison between observed and predicted, average error statistics will emerge as a function of forecast valid time and location. These error statistics may be stored in a shared table of realtime calibration information, that may be subsequently used by the fingerprinter service.

In the case of a system including the capability of forecasting very short-term weather, a single observation may be compared to many different versions of the radar real-time estimates (i.e., current conditions) that may be issued periodically, e.g., twice hourly. FIG. 8 shows this schematically. That is, subsequent issuances of the radar Nowcast or MAPLE forecast may include a time step coincident with observation reports—and each one of these corresponding pairs affords an opportunity to compare the forecast to the actual observation for the purpose of driving a set of calibration statistics.

For example, if forecasts are issued twice hourly and forecasts are six hours duration with a fifteen minute temporal resolution or time step, then there will be thirteen forecasts issued over a six hour period that will coincide—roughly—with the time of any given incoming observation that occurs within the total range of valid times of those thirteen forecasts.

This implies that a calibration or scoring event includes the arrival of a single observation; but a comparison of this observation with many different forecasts preferably takes place to mathematically document the calibration event.

In general, an exemplary calibration event can be written as:

$$\sigma^2(\phi,\lambda,t) = [\text{lookup\_score}_{(wx_{obs} - wx_{est})}]^2 \quad \text{Eq. 1.}$$

Here, $\sigma^2$ is a squared error between observed (obs) and estimated (est); $\phi$ is latitude and $\lambda$ is longitude of the observation point. Variable, t, is time of the observation. The term, lookup_score, refers to an existing static table of values that provide a unit less quantity between 0 and 10 that represents the error score that results when comparing the estimated and observed weather types. A score of 0 is perfect correspondence and a score of 10 is very poor correspondence (e.g., an observed weather of Heavy Snow compared to an estimated weather of Clear might yield a lookup_score of 10.0).

Now, given a set of nearest neighbors an average error or variance can be determined. In the simple case of current conditions mode time, t, is the runtime or current time and time, t*, is the time corresponding to the observation event, i. Thus, the current conditions mode has a listening period, normally limited to the past hour, for which it can compare radar-estimated weather with observations occurring at nearly identical times. For each target point or each grid point, an average variance or error score may be determined from a simple average of all calibration events of the assigned neighbors. This can be written as equation 2 below:

$$\bar{\sigma}^2(\phi, \lambda, t) = \frac{\sum_{i=1}^{n} \sigma_i^2(\phi_i, \lambda_i, t^*)}{n} \quad \text{Eq. 2.}$$

Where $\sigma^2$ is now average variance computed over the range of the neighbor errors and n is the number of valid neighbors for which comparison or lookup events take place.

In the case of the Nowcast or predictive mode of the system, the determination of an average error or variance is more complex. For example, radar forecasts valid for 6 hours into the future at 15 minute time increments may be produced twice hourly. For any given observation that arrives, there are many MAPLE radar or Nowcast forecasts that correspond, roughly, to the time of the observation. These forecasts originate from different forecast releases and the corresponding frame of each forecast release is for a different forecast valid time (i.e., the forecast is valid for a different amount of time beyond the start of the forecast release time).

The system or process preferably aggregates these individual scoring events in some way to reflect the current performance of the radar forecast judged against ground observations. Unlike a current conditions system, this is not a simple question of comparing the most recent radar with the most recent observation. The system and process in the short-term forecast mode preferably addresses the versioning or age of the forecast as well as the valid time or time into the future of the forecast. Fortunately, the behavior of each of these factors is synchronized. That is, for any given observation time, the older the forecast version—the longer into the future will be the corresponding forecast frame.

In terms of forecast error, one skilled in art may expect this behavior to result in two general trends. First, the older the forecast version—the less skilled will be that particular forecast. That is, a forecast made four hours ago will be less skillful than the current forecast for a specific time. Second, forecasts of longer duration will have lower skill. That is, a forecast valid for one hour from the present time will demonstrate more skill than a forecast valid for 5 hours from the present time.

Anticipating this behavior, the systems and processes preferably partition the averaging of forecast error into numerical categories, such as, for example:

1.) Forecasts between 0-2 hours into the future;
2.) Forecasts between 2-4 hours into the future; and
3.) Forecasts between 4-6 hours into the future.

The goal is to find distinct average forecast variances or errors (in the exemplary embodiment three in number) for the different valid time regimes of the 6 hour Nowcast, and to communicate these errors to the main system's radar fingerprinter process via a shared table or database of most recently computed errors. This sharing may or may not take place in real-time or synchronously. The Calibrator system may run as part of the system and/or may run independent of the system—provided that the scoring results are made available to the system, and as long as there is agreement on what comprises the complete domain of ground-based observation stations and a convention for identifying each station.

One of the error scores (three in the example above) may be expressed mathematically as the average of scored forecasts that fall within one of the three time ranges. In the case of the "a" partition, this would be:

$$\overline{\sigma}_a^2(\phi, \lambda, t^*) = \frac{\sum_{i=1}^{n} \sigma_i^2(\phi, \lambda, t^*, F_i^a)}{n} \qquad \text{Eq. 3a.}$$

Where symbol F represents the specific Nowcast forecast, superscript and subscript, α now refers to forecast time steps through the first two hours (0-2 hours) of the Nowcast forecast and time, t*, is coincident with the time of the ground observation or METAR report—or as close in time as possible. In practice, these can be as much as 7½ minutes apart since the METAR is currently reported at any possible minute and the forecast time steps will always be valid for :15, :30, :45, and :00 minutes after each hour.

For completeness, the "b" and "c" partitions are similar to Equation 3a:

$$\overline{\sigma}_b^2(\phi, \lambda, t^*) = \frac{\sum_{i=1}^{n} \sigma_i^2(\phi, \lambda, t^*, F_i^b)}{n} \qquad \text{Eq. 3b.}$$

$$\overline{\sigma}_c^2(\phi, \lambda, t^*) = \frac{\sum_{i=1}^{n} \sigma_i^2(\phi, \lambda, t^*, F_i^c)}{n} \qquad \text{Eq. 3c.}$$

Finally, the calibration process may allow the three partition scores to change more gradually over time. To do this, the process keeps knowledge of the previous score (subscript old) and weighs this along with the newly computed score. The process may give these weights variable amounts and call, ζ, the persistence term as it controls the degree to which the old or previous score is allowed to modulate or influence the newly computed error score:

$$\overline{\sigma}_{a,b,c}^2(\phi, \lambda, t^*)_{new} = \left[ \varsigma \overline{\sigma}_{a,b,c}^2(\phi, \lambda, t^*)_{old} + (1-\varsigma) \frac{\sum_{i=1}^{n} \sigma_i^2(\phi, \lambda, t^*, F_i^{a,b,c})}{n} \right], \qquad \text{Eq. 4.}$$

$$0 \leq \varsigma \leq 1.$$

The exemplary calibration process does not perform nearest neighbor analyses given some target point or point of interest. It simply builds a near real-time table of calibration or error scores based upon the arrival of individual ground observation reports of present weather. When such a report arrives, its timestamp is compared to recent radar forecasts that are valid for roughly this same time. In each case, these forecasts are subdivided into those that are valid for a particular time partition—e.g., 0-2, 2-4, and 4-6 hours—into the future. From this partitioned set, average errors may be computed and stored in an external table. This table may be made available to the radar fingerprinter subsystem to perform a nearest neighbor analysis. The primary system's radar fingerprinter may then compute appropriate weights for the Method I and Method II estimates of weather, blend the two methods into a final result, and impose quality-control and other post-processes before publishing the result to the calling program.

The systems and methods for deriving very short-term weather forecasts may accept inputs of high-resolution present weather or current conditions and/or forecast information. As such, exemplary systems and methods may run in a mode that produces either high-resolution real-time meteorological conditions and/or high spatial and temporal resolution weather forecasts in the short-term period of 0-6 hours. A single code base may be adapted to run either type of weather information—or both simultaneously. The forecast mode of operation may produce a much larger amount of output since it spans a time interval (e.g., a 6 hour time interval) versus a single point in time or near real time. Moreover, the forecast mode may perform calibration or internal verification against ground truth independently and with a time lag, since it produces future predictions of atmospheric state.

The preceding paragraphs describe combination systems and methods that derive and produce real-time synthetic meteorological conditions and short-term forecasts or Nowcast predictions of the future weather conditions. Combination systems may be achieved through the development of new systems and/or adaptations and modifications to existing real-time synthetic weather systems. For example, adaptation of a real-time synthetic weather system may include:

1.) Alteration of the system inputs to include analogs of current weather information that are valid or applicable to the future state of the atmosphere near the earth's surface;
2.) Modularization of some system functions, such as calibration, in order to become time-independent from the real-time system;
3.) Expansion of the notion of a single system time step needed to produce current weather conditions, towards a vector or series of system time steps that may be generated to produce a weather forecast at high-resolution in time and space.

It will be appreciated by those skilled in the art, however, that the computer logic and basic flow of data inputs through the system and the arbitration of two distinct methodologies for determining weather state based on the comparison of physical observation with one of these derivation methods remains mostly unchanged. As detailed in the exemplary embodiments described herein above, recent scientific work developed relevant to the skill of short-term forecasts suggests that the resulting short-term weather forecasts produced from embodiments of the present invention will exceed the accuracy of single mode methods of very short-term forecasts such as, for example, radar extrapolation and explicit and/or warm-start numerical weather prediction. The tight resolution, specificity or detail, frequent refreshing or updating, and rich output of the resulting system for deriving very short-term weather forecasts in time and space will also likely outperform even the most ambitious human-driven very short-term forecasting efforts on the basis of speed, reliability, and completeness.

While the present invention has been described in connection with the exemplary embodiments of the various figures, it is not limited thereto and it is to be understood that other similar embodiments may be used or modifications and additions may be made to the described embodiments for performing the same function of the present invention without deviating therefrom. Furthermore, it should be emphasized that a variety of computer platforms, including handheld device operating systems and other application specific operating systems are contemplated. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims. Also, the appended claims should be construed to include other variants and embodiments of the invention, which may be made by those skilled in the art without departing from the true spirit and scope of the present invention.

What is claimed is:

1. A system for deriving very short-term weather forecasts comprising:
    a database storing weather data and forecast information;
    a plurality of forecasting techniques;
    a forecast engine for determining a blend of inputs from said plurality of forecasting techniques;
    very short-term weather forecasts generated by said forecast engine from said blend of inputs from said plurality of forecasting techniques; and
    an output system for outputting said very short-term weather forecasts,
    wherein said forecast engine further comprises a core system interpolation, wherein said core system interpolation provides:
        a plurality of very short-term meteorological quantities extracted from a public domain dataset at all grid point intersections over a specific location, wherein said a plurality of very short-term meteorological quantities are adjusted from knowledge of a number of nearby human-driven forecasts corresponding to the same point in time;
        a first estimate of meteorological quantities comprising said adjusted meteorological quantities, wherein said first estimate is derived using a downscaling technique based on knowledge of at least one of: climatological gradients or microclimatological relationships of said meteorological quantities in the vicinity of said grid points for said specific location; and
        a second estimate for said meteorological quantities produced by a radar fingerprinter that finds a corresponding future radar image from predicted radar images and future lightning density forecasts that match a valid forecast time, wherein said radar fingerprinter produces said second estimate of said meteorological quantities from a small spatial sub-domain of predicted radar reflectivity, radar-based precipitation type, and lightning probability fields.

2. The system of claim 1, further comprising:
    a calibrator that compares future radar predictions and newly arriving weather observations for known observation sites; and
    a calibration score for each know observation site.

3. The system of claim 2, further comprising:
    a system arbitrator and grid output generator that uses said calibration score from the set of neighbors of said target point or grid intersection; and
    final derived meteorological quantities derived from use of said calibration scores, which are used to determine a blending of said first estimate and said second estimate.

4. A system for deriving very short-term weather forecasts comprising:
    a database storing weather data and forecast information;
    a plurality of forecasting techniques;
    a forecast engine for determining a blend of inputs from said plurality of forecasting techniques;
    very short-term weather forecasts generated by said forecast engine from said blend of inputs from said plurality of forecasting techniques;
    an output system for outputting said very short-term weather forecasts; and
    an internal and objective calibration that is self-adjusting and capable of adapting and synthesizing to many different weather permutations through training based on experience over time.

5. A system for producing weather forecasts about a predicted or estimated state of the atmosphere for a very short-term time period of 0-6 hours, said system comprising:
    an ingestor and quality control system for receiving and validating high-resolution weather data and forecast information for a specific location;
    a core system interpolator;
    a first estimate of surface-based meteorological quantities at grid point intersections derived by said core system interpolator using grid extraction from a public domain dataset and adjusted using human-driven forecasts and a nearest neighbor analysis for said specific location;
    a second estimate produced by a radar fingerprinter using corresponding future radar images and future lightning density forecasts for said specific location;
    a calibrator that derives calibration scores for the set of nearest neighbors and grid point intersections for said specific location, wherein said calibration scores are derived by comparing future radar predictions to newly arriving weather observations from know observation sites;
    an arbitrator and grid output generator that use said calibration scores to determine a blend of said first estimate and said second estimate;
    a final estimate of meteorological quantities for said specific location at a forecast time step derived from said blending of said first and second estimates; and
    an output system for producing said final estimate of meteorological quantities as very short-term weather forecasts covering said time period of about 0-6 hours.

6. A combination system for deriving high-resolution, real-time synthetic meteorological conditions and high-resolution, very short-term weather forecasts for a specific location, said combination system comprising:
    a database storing real-time weather data and forecast information;
    a plurality of forecasting techniques comprising numerical, statistical, and human-driven forecasting techniques;
    an observation/forecast engine for determining a blend of inputs from said plurality of forecasting techniques;
    real-time synthetic meteorological conditions generated by said observation/forecast engine for said specific location;

very short-term weather forecasts generated by said observation/forecast engine from a blend of inputs from said plurality of forecasting techniques; and an output system for outputting said real-time synthetic meteorological conditions and said very short-term weather forecasts.

7. The combination system of claim 6, wherein said observation/forecast engine further comprises:

a current conditions engine for determining real-time synthetic meteorological conditions for said specific location; and a forecast engine for determining a blend of inputs from said plurality of forecasting techniques.

8. The combination system of claim 6, wherein said real-time synthetic meteorological conditions are for the time of about t=0; and wherein said very short-term weather forecasts are for a time period of about t=0 to about t=6 hours.

9. The combination system of claim 6, wherein said very short-term weather forecasts further comprise a blend of:

a first estimate of meteorological quantities derived from said real-time weather data and forecast information;

said first estimate adjusted using knowledge of nearby human-driven forecasts and a downscaling technique based on knowledge of climatological gradients or microclimatological relationships of said meteorological quantities in the vicinity of said specific location;

a second estimate for said meteorological quantities derived from predicted radar images and lightning density forecasts that match a valid forecast time; and calibration scores for a set of nearest neighbors of said specific location, wherein said calibration scores are used to determine said blending of said first and second estimates of meteorological quantities.

10. The combination system of claim 6, wherein said real-time synthetic meteorological conditions further comprise:

estimating first weather conditions at said specified location from said real-time weather data and forecast information;

adjusting said real-time weather data and forecast information by interpolating corrections in accordance with weather conditions at nearest neighbors to said specified location;

estimating second weather conditions at said specified location from radar data; and weighting said first estimated weather conditions and said second estimated weather conditions to generate said real-time synthetic meteorological conditions at said specified location.

11. A computer-implemented method for deriving very short-term weather forecasts at a predetermined location comprising:

receiving very short-term weather forecast data inputs;

estimating first very short-term meteorological quantities at said predetermined location from said very short-term weather forecast data inputs;

adjusting said very short-term weather forecast quantities by interpolating corrections in accordance with weather conditions at nearest neighbors to said predetermined location;

estimating second very short-term meteorological quantities at said predetermined location from corresponding future radar data and future lightning density forecast that matches the valid forecast time;

retrieving calibration scores corresponding to said first and second weather conditions estimates from a set of neighbors to said predetermined location;

using said calibration scores to determine a blending of said first and second weather conditions estimates to determine very short-term weather forecasts; and outputting said very short-term weather forecasts.

12. The method of claim 11, further comprising determining real-time synthetic meteorological conditions.

13. The method of claim 12, further comprising:

receiving weather observation data, short-term forecast data and radar data;

estimating first weather conditions at said predetermined location from said short-term forecast data;

adjusting said short-term forecast data by interpolating corrections in accordance with weather conditions at nearest neighbors to said predetermined location;

estimating second weather conditions at said predetermined location from said radar data; and weighting said first estimated weather conditions and said second estimated weather conditions to determine meteorological data to generate an estimate of actual observed weather conditions at said predetermined location.

14. The method of claim 12, further comprising distinguishing between a system run that produces very short-term weather forecasts and a system run than produces real-time synthetic meteorological conditions.

15. The method of claim 11, further comprising storing said very short-term weather forecasts data inputs in one or more databases.

16. The method of claim 11, further comprising formatting said output for downstream or publishing systems.

17. The method of claim 11, further comprising estimating a future state of the atmosphere in the 0-6 hour time period using said very short-term weather forecasts.

18. The method of claim 11, wherein receiving very short-term weather forecast data inputs further comprises:

receiving a forecast of radar imagery comprising a high-resolution radar image of reflectivity and precipitation type representing a prediction of the state of the precipitation filed over said predetermined location for predetermined time intervals between a desired forecast valid time period; and receiving periodic weather forecasts created for said predetermined location using numerical weather prediction and statistical guidance as a first pass, human forecaster intervention, and a post-process churning of the digital outputs such that the final forecasts are consumable to weather forecasters.

19. A method of claim 11, further comprising:

comparing a corresponding pair of weather conditions comprising an estimated weather condition and an observed weather condition, wherein said corresponding pair of said estimated weather condition and said observed weather condition have a time step coincident;

deriving a set of calibration scores from said comparison; and calibrating said very short-term weather forecasts using said calibration scores.

20. The method of claim 19, wherein said estimated weather condition comprises future radar predictions and said actual weather condition comprises actual radar observations.

21. The method of claim 19, further comprising improving computing efficiencies by:

externalizing or separating said calibration; and only performing said calibration when at least one neighbor observation experiences a subsequent update.

22. The method of claim 19, further comprising:
  determining an average error or variance of said estimated weather condition for each target point or grid point given a set of nearest neighbors;
  aggregating individual scoring events for various forecasting techniques to compare a current performance of said estimated weather condition to said observed weather condition; and
  addressing a versioning or age of said estimated weather condition as well as said valid time of said estimated weather condition.

23. The method of claim 22, further comprising:
  partitioning said averaging of said estimated weather condition errors into scoring categories in order to find distinct average forecast errors or variances for different valid time regimes of said very short-term forecast; and
  communicating said average errors to said very short-term forecasting process.

24. The method of claim 23, further comprising partitioning said averaging of said estimated weather condition errors into scoring categories comprising:
  forecasts between about 0-2 hours into the future;
  forecasts between about 2-4 hours into the future; and
  forecasts between about 4-6 hours into the future.

25. The method of claim 23, further comprising allowing said partition scores to change more gradually over time by:
  keeping knowledge of previous scores; and
  weighing said knowledge of previous scores along with newly computed scores.

26. The method of claim 25, further comprising:
  building a database or table of near-real time error scores or calibration scores based upon the receipt of individual observed weather conditions; and
  comparing said received observed weather condition to recent estimated weather conditions that are valid for approximately the same time.

27. The method of claim 13, further comprising:
  computing appropriate weighs for said first and second weather conditions estimates; and
  using said weights to determine said blending of said first and second weather conditions estimates into said very short-term weather forecasts.

\* \* \* \* \*

UNITED STATES PATENT AND TRADEMARK OFFICE
CERTIFICATE OF CORRECTION

PATENT NO. : 7,542,852 B1
APPLICATION NO. : 11/695353
DATED : June 2, 2009
INVENTOR(S) : Bruce L. Rose et al.

Page 1 of 1

It is certified that error appears in the above-identified patent and that said Letters Patent is hereby corrected as shown below:

On the title page:
Item [73], Assignee, insert:
-- The Weather Channel, Inc.
Atlanta, GA (US) --;

Signed and Sealed this

Tenth Day of November, 2009

David J. Kappos
*Director of the United States Patent and Trademark Office*